(12) United States Patent
Chandler

(10) Patent No.: US 6,927,790 B2
(45) Date of Patent: Aug. 9, 2005

(54) DIGITAL CAMERA SYSTEM PROVIDING FOR CONTROL OF A CAMERA'S OPERATIONAL PARAMETERS AND IMAGE CAPTURE

(75) Inventor: Rand C. Chandler, Gainesville, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 889 days.

(21) Appl. No.: 09/776,869

(22) Filed: Feb. 5, 2001

(65) Prior Publication Data

US 2002/0105580 A1 Aug. 8, 2002

(51) Int. Cl.[7] .............................................. H04N 5/232
(52) U.S. Cl. ............................. 348/211.99; 348/207.1; 348/207.11; 348/552
(58) Field of Search .............................. 348/552, 207.1, 348/207.11, 211.99, 211.1, 211.4, 211.5, 211.6, 211.14, 231.6, 231.9

(56) References Cited

U.S. PATENT DOCUMENTS

| | | | | |
|---|---|---|---|---|
| 6,005,613 A | * | 12/1999 | Endsley et al. | ........... 348/231.6 |
| 6,151,069 A | * | 11/2000 | Dunton et al. | ........... 348/220.1 |
| 6,239,837 B1 | * | 5/2001 | Yamada et al. | .......... 348/231.5 |
| 6,362,851 B1 | * | 3/2002 | Lavelle et al. | ......... 348/333.01 |
| 6,449,495 B1 | * | 9/2002 | Kuba | ......................... 348/552 |
| 6,489,973 B1 | * | 12/2002 | Heiden | ....................... 345/771 |
| 6,567,119 B1 | * | 5/2003 | Parulski et al. | .......... 348/207.2 |
| 6,639,627 B1 | * | 10/2003 | Takezawa et al. | ....... 348/222.1 |
| 6,677,989 B1 | * | 1/2004 | Aizawa et al. | ........... 348/207.1 |
| 6,683,642 B1 | * | 1/2004 | Kobayashi et al. | ...... 348/231.2 |

\* cited by examiner

*Primary Examiner*—Tuan Ho
*Assistant Examiner*—Gevell Selby
(74) *Attorney, Agent, or Firm*—James T. Shepherd

(57) ABSTRACT

A digital camera system includes a digital image sensor, a memory coupled to the digital image sensor via a data bus, a microcontroller having control signal output ports and a data I/O port, and a bi-directional tri-state buffer coupled to the data I/O port and the data bus for passing data therebetween. At least one of the control signal output ports is coupled to each of the digital image sensor, memory and tri-state buffer. The microcontroller issues control signals over it's control signal output ports to control access to the data bus by establishing only one of a plurality of possible data transfer paths at any given point in time.

15 Claims, 1 Drawing Sheet

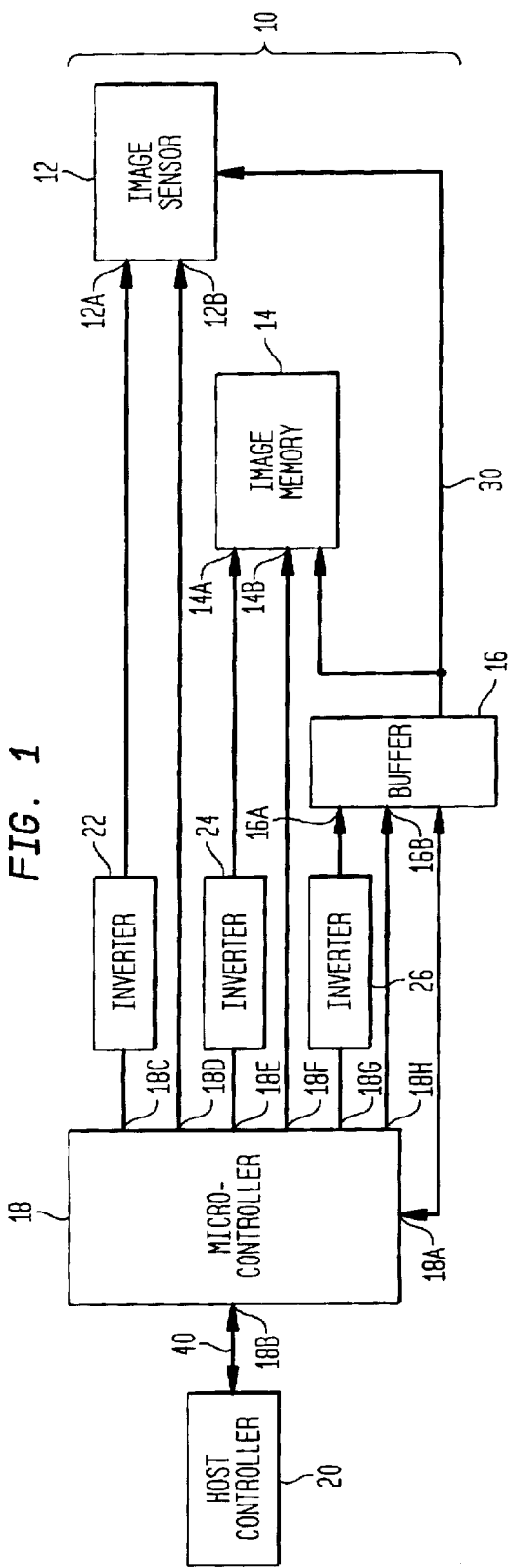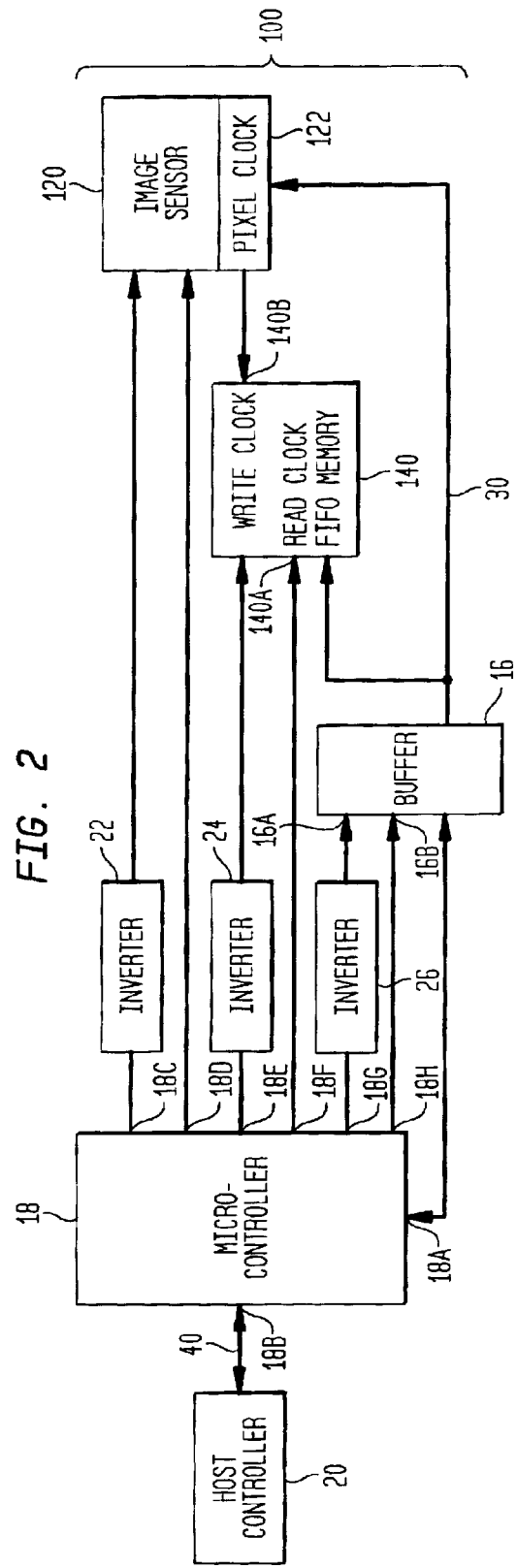

DIGITAL CAMERA SYSTEM PROVIDING FOR CONTROL OF A CAMERA'S OPERATIONAL PARAMETERS AND IMAGE CAPTURE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to cameras, and more particularly to a digital camera system that can capture a single digital image on demand from a remotely-located controller that utilizes RS-232 serial communications.

BACKGROUND OF THE INVENTION

It is frequently desirable to monitor robotic activities from a remote location. To obtain a "robot's eye view" of a work environment, a camera can be mounted on the robot. The camera can be of the single-image or video type. In either case, changing situations can necessitate changes in the camera's operating parameters in order to optimize the imaging capability of the camera. Such changes are ideally made from a remote location. This is especially true when the robot and its camera are operating in dangerous or hazardous environments.

SUMMARY OF THE INVENTION

Accordingly, it is an object of the present invention to provide a remotely-controllable camera system.

Another object of the present invention is to provide a digital camera system that can be controlled from a host controller.

A still further object of the present invention is to provide a remotely-controllable digital camera system that can be operated using a standard personal computer.

Other objects and advantages of the present invention will become more obvious hereinafter in the specification and drawings.

In accordance with the present invention, a digital camera system includes a host controller which can be remotely located with respect to the rest of the system. A digital image sensor senses a digital image defined by pixels of data. A memory is coupled to the digital image sensor via a data bus. A microcontroller having an RS-232 serial input/output (I/O) port is coupled to the host controller. The microcontroller has control signal output ports and a data I/O port. A bidirectional tri-state buffer is coupled to the data I/O port and the data bus for passing data therebetween. At least one of the control signal output ports is coupled to each of the digital image sensor, memory and tri-state buffer. The microcontroller receives control signals from the host controller and issues these control signals over it's control signal output ports to control access to the data bus. Specifically, the control signals are used to establish one of a plurality of possible data transfer paths. A first data transfer path allows data to be transferred from the microcontroller through the tri-state buffer to the digital image sensor. A second data transfer path allows data to be transferred from the digital image sensor to the memory. A third data transfer path allows data to be transferred from the memory through the buffer to the host controller via the RS-232 serial I/O port of the microcontroller.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a block diagram of a remotely-controllable digital camera system according to the present invention; and FIG. 2 is a block diagram of the camera system utilizing a simple first-in, first-out (FIFO) memory for the image memory.

DETAILED DESCRIPTION OF THE INVENTION

Referring now to the drawings, and more particularly to FIG. 1, a block diagram of a remotely-controllable camera system is shown and referenced generally by numeral 10. Camera system 10 will be described for its use in the capture and transmission of a single image. However, as would be understood by one of ordinary skill in the art, the present invention could also be used to capture and transmit video images.

Camera system 10 includes a digital image sensor 12, an image storage or memory 14, a bi-directional tri-state buffer 16, a microcontroller 18 and a host controller 20 (e.g., a personal computer) that can be remotely located with respect to the other elements of camera system 10. As will be explained further below, camera system 10 can also include inverters 22, 24 and 26.

With respect to data transfer throughout camera system 10, a data bus 30 couples digital image sensor 12 to image memory 14. A data input/output (I/O) port 18A of microcontroller 18 is coupled to data bus 30 through buffer 16. Data transfer between data I/O port 18A and host controller 20 occurs over an RS-232 serial link 40 coupling host controller 20 to an RS-232 serial I/O port 18B of microcontroller 18.

With respect to the transfer of control signals throughout camera system 10, microcontroller 18 has a plurality of control signal ports to include ports 18C–18H. Note that more or less control signal ports may be provided/used depending on the particular configuration of camera system 10. The control signals issued on ports 18C–18H can be initiated from host controller 20 (and delivered via RS-232 serial link 40) and/or generated within the programming code of microcontroller 18.

Ports 18C, 18E and 18G are coupled to the respective enable/disable ports 12A, 14A and 16A of digital image sensor 12, image memory 14 and buffer 16 for the selective enabling or disabling thereof. For example, at power-up, it is desirable to disable each of digital image sensor 12, image memory 14 and buffer 16 in order to prevent contention for data bus 30. Further, as will be explained further below, the prevention of contention for data bus 30 is a feature of the present invention throughout its operation.

Depending on the configuration of the individual devices (i.e., sensor 12, memory 14, buffer 16 and microcontroller 18), inverters 22, 24 and 26 may or may not be required. For example, if microcontroller 18 is configured to output a digital "low" at power up on each of its control signal ports and the enable/disable ports 12A, 14A and 16A are configured to disable on receipt of a digital "high", then inverters 22, 24 and 26 are required.

Control signal port 18D is coupled to a control signal input port 12B of image sensor 12. Control signals passed to image sensor 12 via port 12B could include a request to initiate an image capture or a request to modify one or more of the image sensor's parameters such as the image sensor's setting for automatic or manual exposure, the gain setting of the image sensor's amplifier, or other adjustable parameters of the image sensor. If the modification requires new data to be transferred to the registers (not shown) of image sensor 12, such data transfer will follow a path from microcontroller 18 through buffer 16 and onto data bus 30 as will be explained further below.

Control signal port 18F is coupled to a control signal input port 14B of image memory 14. Control signals passed to image memory 14 via port 14B initiate the reading of data stored in image memory 14. One way to bring about the reading of image data stored in image memory 14 will be explained by way of example below.

Control signal port 18H is coupled to a control signal input port 16B of buffer 16. Control signals passed to buffer 16 via port 16B control the direction of data flow through buffer 16, i.e., either from or to microcontroller 18.

Camera system 10 is operated to enable one of three possible data transfer paths. The first data transfer path allows data to be transferred from microcontroller 18 through buffer 16 and onto data bus 30 where it can be read by image sensor 12. Note that this is the data transfer path used to modify the various operating parameters of image sensor 12 as explained above. To achieve this first data transfer path without contention for data bus 30, control signals are issued by microcontroller 18 to disable image memory 14 and set buffer 16 for a data flow direction in which data is transferred from microcontroller 18 to data bus 30.

The second data transfer path couples image sensor 12 to image memory 14 via data bus 30. That is, the second data transfer path is enabled when an image capture has been requested. To achieve this second data path without contention for data bus 30, control signals are issued by microcontroller 18 to enable image memory 14 while buffer 16 is tri-stated to effectively uncouple it from data bus 30.

The third data transfer path couples image memory 14 to port 18A of microcontroller 18 via buffer 16. That is, the third data transfer path is enabled when image data is to be transferred from image memory 14 to host controller 20 via microcontroller 18. To achieve this third data transfer path without contention for data bus 30, control signals are issued by microcontroller 18 to enable image memory 14 and disable image sensor 12 while setting buffer 16 for a data flow direction in which data is transferred from data bus 30 to microcontroller 18.

By way of example, a simple embodiment of the present invention, is referenced by camera system 100 in FIG. 2 where like reference numerals are used for those elements that are common with FIG. 1. Camera system 100 makes use of a first-in, first-out (FIFO) non-addressable dynamic random access memory (DRAM) 140. FIFO memory 140 includes a READ clock port 140A coupled to port 18F of microcontroller 18, and further includes a WRITE clock port 140B coupled to a pixel clock 122 of an image sensor 120. More specifically, pixel clock 122 generates a clock signal that is associated with each pixel of data in an image being captured by image sensor 120. One such image sensor having this capability is a CMOS image sensor available from OmniVision Technologies Inc., Sunnyvale, Calif.

Each pixel clock signal applied to WRITE clock port 140B clocks data into FIFO memory 140 over data bus 30. When it is time to read data from FIFO memory 140, microcontroller 18 (via port 18F) applies a clock signal to READ clock port 140A thereby causing data to be clocked from FIFO memory 140. Based on the tri-state configuration of buffer 16 (i.e., for the third data transfer path), the clocked out data is transferred to host controller 20 via microcontroller 18.

A suitable microcontroller that can be used in camera system 100 is the 68HC811E2 8-bit microcontroller available from Motorola Corporation, Austin, Tex. Note that use of this microcontroller with the above-described OmniVision image sensor requires the use of inverters 22, 24 and 26, which can be incorporated on a single chip (e.g., the 74HC04 inverter chip) as is well known in the art. A suitable buffer 16 that can be used in camera system 100 is a 74HC245 8-bit bi-directional tri-state buffer available commercially from a variety of manufacturers. A suitable FIFO memory 140 is the AL422B FIFO memory available commercially from AverLogic Technologies Inc., San Jose, Calif.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A digital camera system, comprising:
   a host controller;
   a digital image sensor for sensing a digital image defined by pixels of data;
   a memory coupled to said digital image sensor via a data bus;
   a microcontroller having an RS-232 serial input/output (I/O) port coupled to said host controller, said microcontroller further having control signal output ports and a data I/O port;
   a bi-directional tri-state buffer coupled to said data I/O port and said data bus for passing data therebetween;
   at least one of said control signal output ports coupled to each of said digital image sensor, said memory and said tri-state buffer;
   said microcontroller receiving control signals from said host controller and issuing said control signals over said control signal output ports to control access to said data bus wherein only one of a plurality of data transfer paths is established, said plurality of data transfer paths including a first data transfer path from said microcontroller through said tri-state buffer to said digital image sensor, a second data transfer path from said digital image sensor to said memory, and a third data transfer path from said memory through said buffer to said host controller via said RS-232 serial I/O port of said microcontroller, wherein said memory is disabled by said microcontroller when said one of said plurality of data transfer paths is said first data transfer path.

2. A digital camera system as in claim 1 wherein said memory is a first-in, first-out (FIFO) memory.

3. A digital camera system as in claim 2 wherein said FIFO memory has a READ clock input and a WRITE clock input, said READ clock input controlling transfer of data from said FIFO memory and said WRITE clock input controlling transfer of data into said FIFO memory.

4. A digital camera system as in claim 3 wherein said digital image sensor includes a pixel clock for generating a pixel clock signal associated with each of said pixels of data in said digital image, said pixel clock being coupled to said WRITE clock input of said FIFO memory.

5. A digital camera system as in claim 1 wherein said digital image sensor is disabled by said microcontroller when said one of said plurality of data transfer paths is said third data transfer path.

6. A digital camera system, comprising:
- a digital image sensor for sensing a digital image defined by pixels of data;
- a memory coupled to said digital image sensor via a data bus;
- a microcontroller having an RS-232 serial input/output (I/O) port, control signal output ports and a data I/O port;
- a bi-directional tri-state buffer coupled to said data I/O port and said data bus for passing data therebetween;
- at least one of said control signal output ports coupled to each of said digital image sensor, said memory and said tri-state buffer;
- said microcontroller receiving control signals over said RS-232 serial I/O port and issuing said control signals over said control signal output ports to control access to said data bus wherein only one of a plurality of data transfer paths is established, said plurality of data transfer paths including a first data transfer path from said microcontroller through said tri-state buffer to said digital image sensor, a second data transfer path from said digital image sensor to said memory, and a third data transfer path from said memory through said buffer to said RS-232 serial I/O port of said microcontroller, wherein said memory is disabled by said microcontroller when said one of said plurality of data transfer paths is said first data transfer path.

7. A digital camera system as in claim 6 wherein said memory is a first-in, first-out (FIFO) memory.

8. A digital camera system as in claim 7 wherein said FIFO memory has a READ clock input and a WRITE clock input, said READ clock input controlling transfer of data from said FIFO memory and said WRITE clock input controlling transfer of data into said FIFO memory.

9. A digital camera system as in claim 8 wherein said digital image sensor includes a pixel clock for generating a pixel clock signal associated with each of said pixels of data in said digital image, said pixel clock being coupled to said WRITE clock input of said FIFO memory.

10. A digital camera system as in claim 6 wherein said digital image sensor is disabled by said microcontroller when said one of said plurality of data transfer paths is said third data transfer path.

11. A digital camera system, comprising:
- a digital image sensor for sensing a digital image defined by pixels of data;
- a memory coupled to said digital image sensor via a data bus;
- a microcontroller having control signal output ports and a data I/O port;
- bi-directional tri-state buffer coupled to said data I/O port and said data bus for passing data therebetween;
- at least one of said control signal output ports coupled to each of said digital image sensor, said memory and said tri-state buffer;
- said microcontroller issuing control signals over said control signal output ports to control access to said data bus wherein only one of a plurality of data transfer paths is established, said plurality of data transfer paths including a first data transfer path from said microcontroller through said tri-state buffer to said digital image sensor, a second data transfer path from said digital image sensor to said memory, and a third data transfer path from said memory through said buffer to said microcontroller, wherein said memory is disabled by said microcontroller when said one of said plurality of data transfer paths is said first data transfer path.

12. A digital camera system as in claim 11 wherein said memory is a first-in, first-out (FIFO) memory.

13. A digital camera system as in claim 12 wherein said FIFO memory has a READ clock input and a WRITE clock input, said READ clock input controlling transfer of data from said FIFO memory and said WRITE clock input controlling transfer of data into said FIFO memory.

14. A digital camera system as in claim 13 wherein said digital image sensor includes a pixel clock for generating a pixel clock signal associated with each of said pixels of data in said digital image, said pixel clock being coupled to said WRITE clock input of said FIFO memory.

15. A digital camera system as in claim 11 wherein said digital image sensor is disabled by said microcontroller when said one of said plurality of data transfer paths is said third data transfer path.

* * * * *